(12) United States Patent
Guo et al.

(10) Patent No.: US 8,249,922 B2
(45) Date of Patent: Aug. 21, 2012

(54) METHOD AND APPARATUS FOR ADVERTISEMENT DELIVERY IN WIRELESS NETWORKS

(75) Inventors: Katherine H. Guo, Scotch Plains, NJ (US); Arun N. Netravali, Westfield, NJ (US); Krishan K. Sabnani, Westfield, NJ (US)

(73) Assignee: Alcatel Lucent, Paris (FR)

( * ) Notice: Subject to any disclaimer, the term of this patent is extended or adjusted under 35 U.S.C. 154(b) by 1467 days.

(21) Appl. No.: 11/763,813

(22) Filed: Jun. 15, 2007

(65) Prior Publication Data
US 2008/0313033 A1    Dec. 18, 2008

(51) Int. Cl.
*G06Q 30/00* (2012.01)
(52) U.S. Cl. ................................................. 705/14.1
(58) Field of Classification Search .................. 705/14.1
See application file for complete search history.

(56) References Cited

U.S. PATENT DOCUMENTS

| | | | |
|---|---|---|---|
| 6,522,875 B1 * | 2/2003 | Dowling et al. | 455/414.3 |
| 2002/0035605 A1 * | 3/2002 | McDowell et al. | 709/206 |
| 2003/0050837 A1 * | 3/2003 | Kim | 705/14 |

OTHER PUBLICATIONS

International Search Report and Written Opinion dated Jun. 23, 2009 in International Application No. PCT/US2008/007190, Lucent Technologies Inc., Applicant, 11 pages.
Statement in accordance with the Notice from the European Patent Office dated Oct. 1, 2007 concerning business methods (OJ EPO Nov. 2007, 592-593), 1 page.

* cited by examiner

*Primary Examiner* — Daniel Lastra
(74) *Attorney, Agent, or Firm* — Wall & Tong, LLP

(57) ABSTRACT

The invention provides for advertising content selection, presentation, and statistics reporting at a wireless user terminal. The invention includes a method for selecting a subset of advertising content for presentation at the wireless user terminal. The invention includes a method for presenting advertising content at a wireless user terminal in response to one or more conditions detected at the wireless user terminal. The invention includes a method for collecting advertising content presentation statistics and providing the advertising content presentation statistics to at least one network system. In one embodiment, the invention may include one or more of the advertising content selection, presentation, and statistics reporting functions.

16 Claims, 6 Drawing Sheets

US 8,249,922 B2

METHOD AND APPARATUS FOR ADVERTISEMENT DELIVERY IN WIRELESS NETWORKS

FIELD OF THE INVENTION

The invention relates to the field of communication networks and, more specifically, to delivering advertisements in wireless networks.

BACKGROUND OF THE INVENTION

With increasing bandwidth available in Third Generation (3G) wireless networks, wireless service providers have started providing multimedia content, e.g., streaming video content, in addition to existing voice and data services. Wireless service providers are using a number of approaches to send data and video streams to wireless user terminals, such as using 3G unicast channels, 3G multicast channels, and 3G broadcast networks (e.g., Europe's Digital Video Broadcasting-Handheld (DVB-H) network and North America's Forward Link Only (FLO) network). In order to generate additional revenue, advertising is increasingly becoming an integral part of the content delivery strategy.

Using unicast channels to deliver content, the network typically delivers advertisements upon requests from users. For example, in exchange for free Internet searching service, advertisements are shown next to the search results (e.g., using Google, Yahoo, and like Internet search sites). Another example is Multimedia Ringback Service, in which content, including advertisements, is provided to the calling party before the called party answers the incoming call. Disadvantageously, however, delivery of advertisements over unicast channels often requires the same advertisements to be transmitted over the unicast network many times to many different users, thereby consuming valuable network resources.

Using multicast channels to deliver content, users with similar interests can join the same multicast group in order to receive content available over that multicast group. Using broadcast channels to deliver content, the network typically delivers advertisements along with the content by broadcasting the content to users. Disadvantageously, however, while advertisements delivered to users over multicast channels and broadcast channels may be tailored to the geographical location of the group of users receiving the multicast or broadcast content, advertisements delivered to such users may not be tailored to those individual users receiving the multicast or broadcast content.

SUMMARY OF THE INVENTION

Various deficiencies in the prior art are addressed through an invention providing for advertising content selection, presentation, and statistics reporting at a wireless user terminal. The invention includes a method for selecting a subset of advertising content for presentation at the wireless user terminal. The invention includes a method for presenting advertising content at a wireless user terminal in response to one or more conditions detected at the wireless user terminal. The invention includes a method for collecting advertising content presentation statistics and providing the advertising content presentation statistics to at least one network system. In one embodiment, the invention may include one or more of the advertising content selection, presentation, and statistics reporting functions.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables improved delivery and presentation of advertising content at wireless user terminal. The present invention provides advertising content selection functions for selecting a subset of received advertising content for presentation at a wireless user device. The present invention provides advertising content presentation functions for presenting advertising content on a wireless user terminal under various conditions. The present invention provides advertising content presentation statistics reporting functions for reporting information regarding advertising content presented on a wireless user terminal. The advertising content selection, presentation, and statistics reporting functions of the present invention may be implemented alone or in different combinations.

Figure 1:
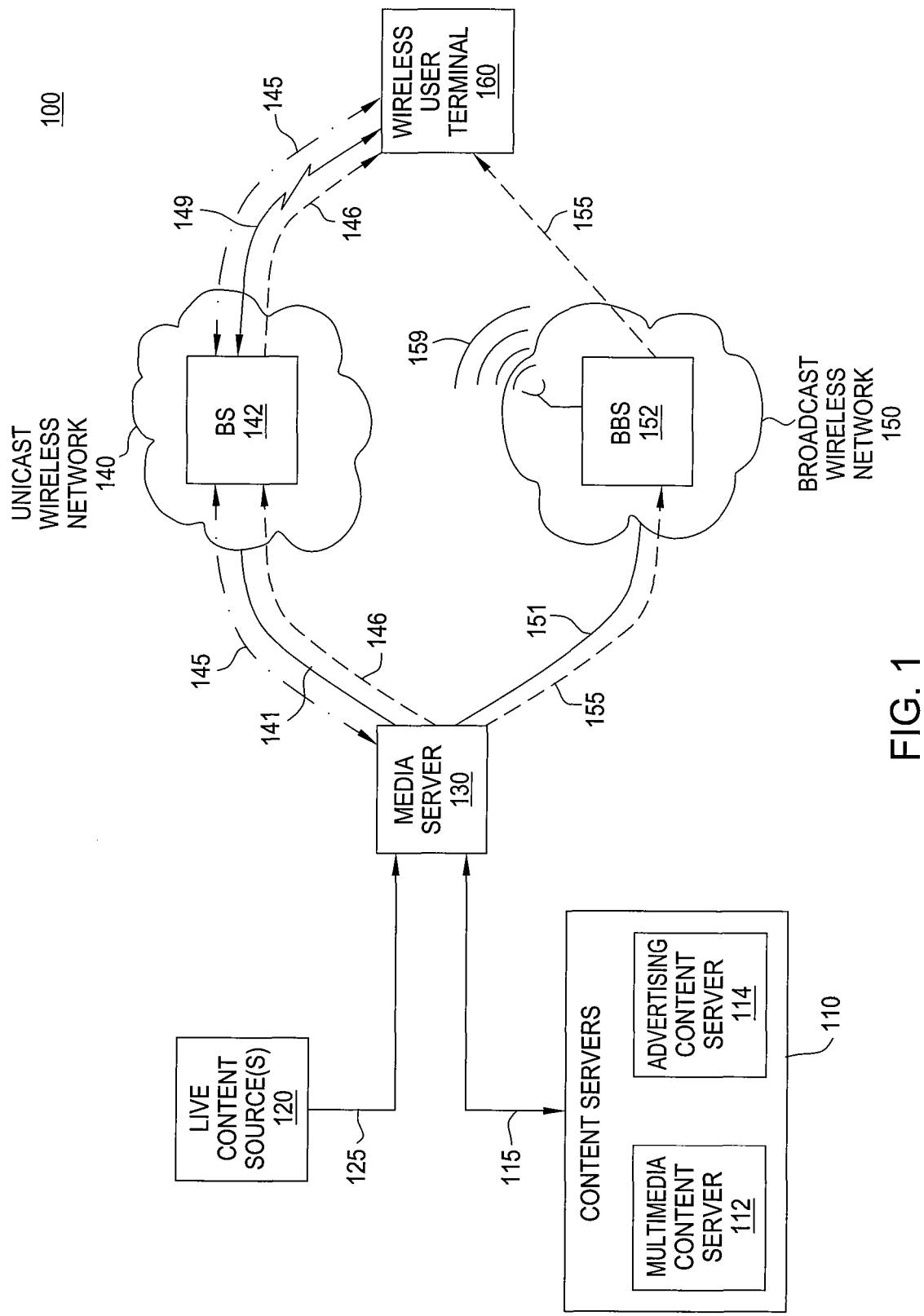
FIG. 1 depicts a high-level block diagram of a communication network.

FIG. 1 depicts a high-level block diagram of a communication network for propagating content from content sources to wireless user terminals. Specifically, communication network 100 includes content sources including content servers 110 and live content source(s) 120, a media server 130, a unicast wireless network (UWN) 140, a broadcast wireless network (BWN) 150, and a wireless user terminal (WUT) 160. Although depicted and described with respect to specific types, numbers, and configurations of networks and associated network elements, the various advertising content control functions of the present invention may be implemented using various other types, numbers, and configurations of networks and associated network elements.

The content servers 110 include a multimedia content server 112 and an advertising content server 114. The content servers 110 provide a combination of multimedia content from multimedia content server 112 and advertising content from advertising content server 114 to media server 130 for distribution over UWN 140 and/or BWN 150. The content servers 110 provide the combination of multimedia content from multimedia content server 112 and advertising content from advertising content server 114 to media server 130 using a communication path 115. Although depicted as a direct connection between content servers 110 and media server 130, communication path 115 may traverse one or more networks, such as private networks, public networks (e.g., the Internet), and the like, as well as various combinations thereof.

The multimedia content stored on multimedia content server 112 may include text content, audio content, video content, multimedia content, and the like, as well as various combinations thereof. The advertising content stored on advertising content server 114 may include any advertising content, in any format (e.g., text-based advertisements, audio advertisements, image advertisements, video advertisements, and the like, as well as various combinations thereof. Although depicted as individual servers, multimedia content server 112 and advertising content server 114 may be implemented as one server.

The live content source(s) 120 provide streaming content including a combination of multimedia content and advertising content. For example, live content source(s) 120 may include Internet television servers providing streaming television channels to media server 130 for distribution over UWN 140 and/or BWN 150. The live content sources 120 may provide other live content including multimedia content and advertising content. The live content source(s) 120 provide the combination of multimedia content and advertising content to media server 130 using a communication path 125. Although depicted as a direct connection between live content source(s) 120 and media server 130, communication path 125 may traverse one or more networks, such as private networks, public networks (e.g., the Internet), and the like, as well as various combinations thereof.

The media server 130 receives content from content servers 110 and live content source(s) 120. The media server 130 may provide the content toward WUT 160 using UWN 140 and/or BWN 150. The media server 130 provides content to UWN using a communication path 141. Although depicted as a direct connection between media server 130 and UWN 140, communication path 141 may traverse one or more networks, such as private networks, public networks (e.g., the Internet), and the like, as well as various combinations thereof. The media server 130 provides content to BWN 150 using a communication path 151. Although depicted as a direct connection between media server 130 and BWN 150, communication path 151 may traverse one or more networks, such as private networks, public networks (e.g., the Internet), and the like, as well as various combinations thereof.

The UWN 140 is a unicast wireless network supporting communication between media server 130 and WUT 160. The UWN 140 includes a base station (BS) 142 supporting communication between media server 130 and WUT 160. The BS 142 communicates with WUT 160 using a wireless communication path (WCP) 149. For example, UWN 140 may be implemented as a General Packet Radio Service (GPRS) wireless network, a Universal Mobile Telecommunications System (UMTS) wireless network, a Code Division Multiple Access (CDMA) 2000 (CDMA2000)-based Evolution Data Optimized (EvDO) wireless network, and the like.

The UWN 140 supports a bidirectional unicast wireless channel (denoted as unicast channel 145) between media server 130 and WUT 160. The UWN 140 supports a multicast wireless channel (denoted as multicast channel) 146 between media server 130 and WUT 160 (as well as other wireless user terminals that join that multicast group, omitted here for purposes of clarity). The UWN 140 supports downstream communication of content from media server 130 to WUT 160 using unicast channel 145 and/or multicast channel 146. The content may include a combination of multimedia content (i.e., non-advertising content such as audio clips, video clips, and the like) and advertising content. In one embodiment, the content may include advertising content only (i.e., not provided in combination with non-advertising content). The UWN 140 supports upstream communication of information (e.g., control information, content requests, advertising content presentation statistics, and the like) from WUT 160 to media server 130 (and other network components, depending on the type and purpose of the information) using unicast channel 145.

The BWN 150 is a broadcast wireless network supporting broadcast channels. The BWN 150 includes a broadcast base station (BBS) 152 supporting communication from media server 130 to WUT 160. The BBS 152 broadcasts information to WUT 160 using a wireless communication path (WCP) 159. For example, BWN 150 may be implemented as a Media-Forward Link Only (MediaFLO) network, a Digital Video Broadcasting-Handheld (DVB-H) network, a Digital Multimedia Broadcasting (DMB) network, and the like.

The BWN 150 supports a broadcast wireless channel denoted as broadcast channel 155) between media server 130 and WUT 160. The broadcast channel 155 is a unidirectional channel supporting wireless broadcasting of content from media server 130 to WUT 160. The content may include a combination of multimedia content (i.e., non-advertising content such as television programming, movies, and the like) and advertising content. In one embodiment, the content may include only advertising content (i.e., not provided in combination with non-advertising content). The BWN 150 does not support upstream communications from WUT 160 to media server 130 (which is instead provided by UWN 140, specifically, by unicast channel 145 of UWN 140).

The WUT 160 is any wireless user terminal. As depicted in FIG. 1, WUT 160 is adapted for receiving content from media server 130 over UWN 140 via WCP 149 using unicast channel 145 and/or multicast channel 146 and receiving content from media server 130 over BWN 150 via WCP 159 using broadcast channel 155. The WUT 160 is adapted for presenting received content to one or more users using one or more presentation interfaces. The WUT 160 is adapted for providing information (e.g., control information, requests for content, advertising content presentation statistics information, and the like) over UWN 140 via WCP 149 using unicast channel 145. For example, WUT 160 may include a laptop computer, a mobile phone, a personal digital assistant (PDA), and the like.

The WUT 160 is adapted for performing functions associated with received advertising content, including one or more of selecting a subset of received advertising content for presentation, presenting advertising content according to one or more advertising content presentation rules, and collecting advertising content presentation statistics and propagating collected advertising content presentation statistics to one or more network systems, and the like, as well as various combinations thereof. The WUT 160 may be better understood with respect to FIG. 2. The operation of WUT 160 in performing advertising content selection, advertising content presentation, and advertising content presentation statistics reporting may be better understood with respect to FIG. 3, FIG. 4, and FIG. 5, respectively.

Figure 2:
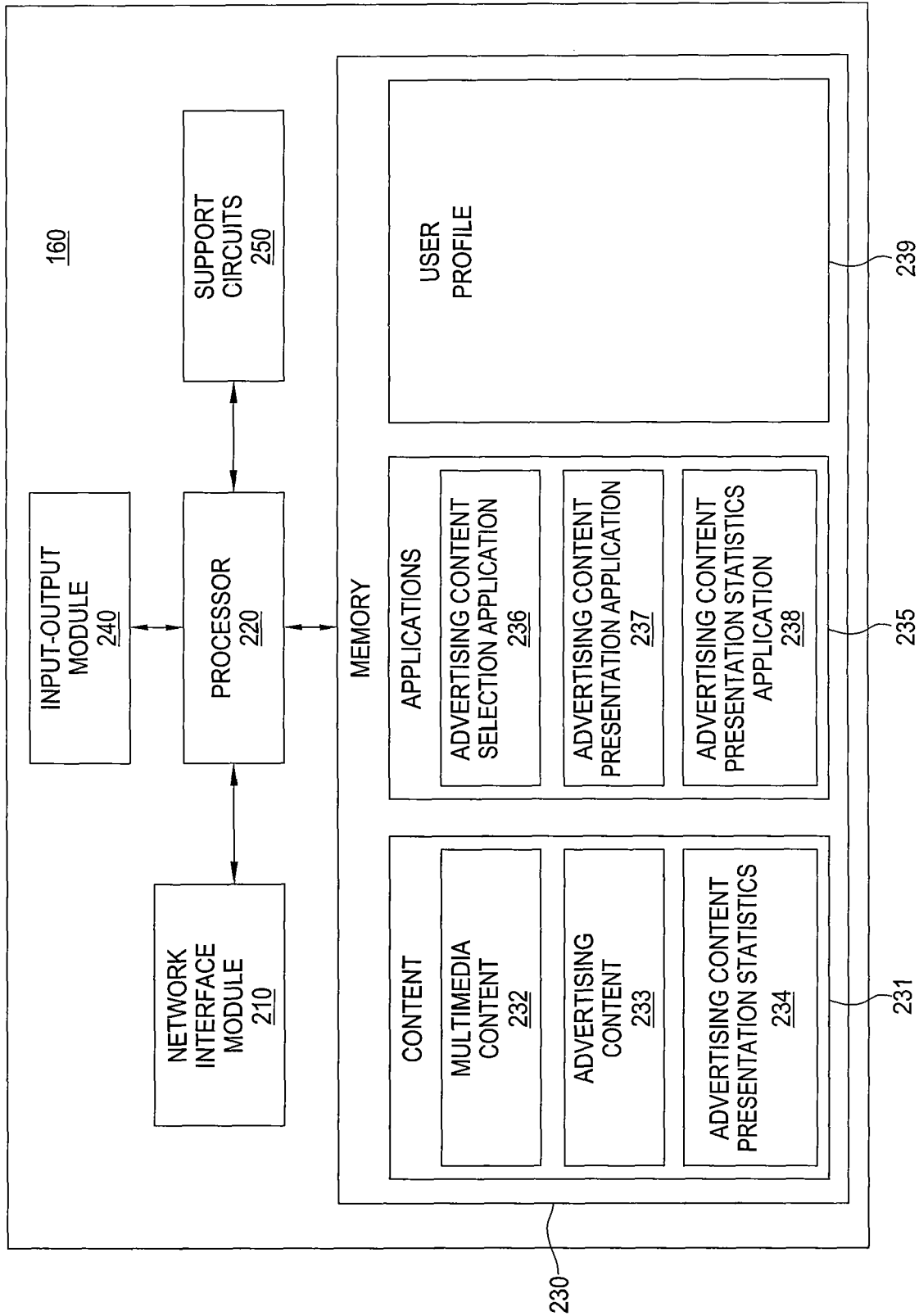
FIG. 2 depicts a high-level block diagram of the wireless user terminal of the communication network of FIG. 1.

FIG. 2 depicts a high-level block diagram of the wireless user terminal of the communication network of FIG. 1. Specifically, WUT 160 includes a network interface module (NIM) 210, a processor 220, a memory 230, an input-output module (IOM) 240, and support circuits (SCs) 250. The processor 220 cooperates with NIM 210, memory 230, IOM 240, and SCs 250 to provide various functions of the present invention, including performing advertising content selection, advertising content presentation, and advertising content statistics reporting, and like functions, as well as various combinations thereof.

The NIM 210 operates as a transceiver, receiving information from UWN 140 (over one or both of unicast channel 145 and multicast channel 146), receiving information from BWN 150 (over broadcast channel 155), and transmitting information to UWN 140 (over unicast channel 145). The NIM 210 provides received information (e.g., multimedia content, advertising content, and the like) to processor 220 for processing and, depending on the information, storage in memory 230. Although primarily depicted and described with respect to one NIM 210, WUT 10 may include multiple network interface modules adapted for interfacing with different types of wireless networks.

The memory 230 stores content 231, applications 235, and user profile 239. The content 231 includes content received over UWN 140 and/or BWN, multimedia content 232 and advertising content 233. The processor 220 may process a combination of multimedia content and advertising content in order to separate the multimedia content and advertising content for storage as multimedia content 232 and advertising content 233, respectively. The content 231 may further include collected advertising content presentation statistics 234. The applications 235 include an advertising content selection application 236 (depicted and described with respect to FIG. 3), an advertising content presentation application 237 (depicted and described with respect to FIG. 4), and an advertising content presentation statistics application 238 (depicted and described with respect to FIG. 5). The user profile 239 includes user profile information.

The IOM 240 includes one or more user interfaces and one or more presentation interfaces. The user interfaces include any interfaces by which a user may request content, control content, interact with content, provide feedback regarding content, and perform like input functions. For example, user interfaces of a wireless user terminal may include keyboards, keypads, touch screens, microphones, and the like, as well as various combinations thereof. The presentation interfaces include any interfaces by which content may be presented to a user. For example, presentation interfaces of a wireless user terminal may include display screens, speakers, and the like, as well as various combinations thereof.

The processor 220 controls processing of input information received via IOM 240, providing information to NIM 210 for transmission over UWN 140, providing information to memory 230 for local storage of information, and the like, as well as various combinations thereof. The processor controls presentation of content via IOM 240, receiving information from NIM 210 and providing the received information to IOM 240 for presentation to the user, retrieving information from memory 230 and providing the retrieved information to IOM 240 for presentation to the user, and the like, as well as various combinations thereof.

The processor 220, in cooperation with NIM 210, memory 230, IOM 240, and SCs 250, controls various functions of the present invention. The processor 220 may execute advertising content selection application 236 in order to select a subset of received advertising content for presentation via IOM 240, as depicted and described with respect to FIG. 3. The processor 220 may execute advertising content presentation application 237 in order to control presentation of advertising content via IOM 240, as depicted and described with respect to FIG. 4. The processor 220 may execute advertising content presentation statistics application 238 in order to collect statistics regarding advertising content presented at WUT 160 and provide the collected advertising content presentation statistics to NIM 210 for transmission over UWN 140, as depicted and described with respect to FIG. 5.

Figure 3:
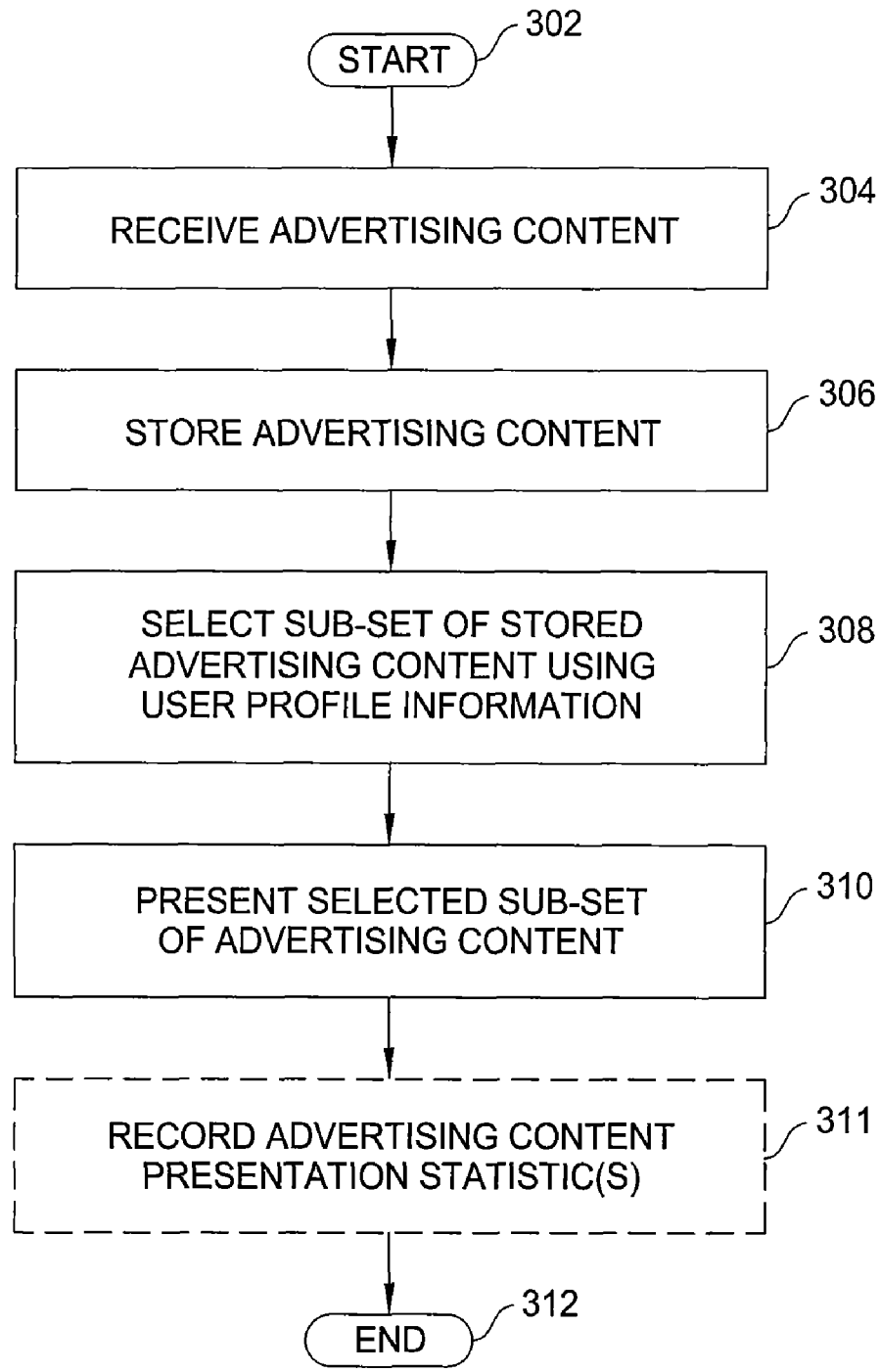
FIG. 3 depicts a method according to one embodiment of the present invention.

FIG. 3 depicts a method according to one embodiment of the present invention. Specifically, method 300 of FIG. 3 includes a method for selecting a subset of received advertising content for presentation using one or more presentation interfaces. Although depicted and described as being performed serially, at least a portion of the steps of method 300 of FIG. 3 may be performed contemporaneously, or in a different order than depicted and described with respect to FIG. 3. The method 300 begins at step 302 and proceeds to step 304.

At step 304, advertising content is received. The advertising content is received at a wireless user terminal. The advertising content may be received over one or more of a unicast wireless channel(s), a multicast wireless channel(s), and a broadcast wireless channel(s). The advertising content may be received in combination with other content and/or separately from other content. The advertising content may include any content format, such as text-based advertisements, audio advertisements, image-based advertisements, video advertisements, multimedia advertisements, and the like, as well as various combinations thereof.

At step 306, the received advertising content is stored at the wireless user terminal. In one embodiment, in which the advertising content is received by itself (i.e., not in combination with other content), the received advertising content may be stored without any additional processing. In one embodiment, in which the advertising content is received in combination with other content, the advertising content may be separated or extracted from the other content for storage at the wireless user terminal. For example, where television programming is streamed to a wireless user terminal, video advertisements included within in commercial breaks in the television programming may be extracted from the television programming for storage at the wireless user terminal.

At step 308, a subset of the stored advertising content is selected. The subset of the stored advertising content is selected using user profile information. The user profile information includes information from a user profile stored on the wireless user terminal. The user profile information may include any information adapted for selecting a subset of available advertising content.

In one embodiment, the user profile information may specify one or more content formats preferred by the user. For example, the user may prefer to be presented only image-based advertisements, video advertisements, and multimedia advertisements. In one embodiment, the user profile may specify one or more different types of advertising content. For example, one user may prefer to be presented with advertisements related to sports, cars, and television programs while another user may prefer to be presented with advertisements related to upcoming movies, upcoming concerts, and newly released books. In one embodiment, the user profile may include rankings for different formats and types of advertising content such that the subset of advertising content selected is selected according to such rankings.

In other words, from the embodiments and examples described above, it is clear that there is no limit to the different formats and types of content which may be specified by user profile information. The user profile information may include any information which may be used to select between advertising content such that a subset of available advertising content may be selected for presentation via a user terminal. Furthermore, selection of the subset of stored advertising content may be performed using any means of selecting content using user profile information.

In one embodiment, for example, in which an advertisement has one or more keywords associated with it that describes the type of content, the one or more keywords associated with the advertisement may be compared with keywords of the user profile information in order to determine whether to select that advertisement for presentation to the user. In another embodiment, for example, at least a portion of the advertising content may be parsed in order to identify the type or types of content included within the advertisement, and the identified type(s) of content may be compared with keywords of the user profile information in order to determine whether to select that advertisement for presentation to the user. Other methods of selecting advertising content may be used as well.

The user profile information stored at the wireless user terminal may be updated manually by the user, automatically by the wireless user device (e.g., based on the types of content reviewed by the user most often, the types of content reviewed the user most recently, the format of content reviewed by the user, and the like), automatically by one or more network devices (e.g., by one or more network devices which may push user profile information to the wireless user terminal for storage in the user profile, which may be determined by the one or more network devices based on the types of content reviewed by the user most often, the types of content reviewed the user most recently, the format of content reviewed by the user, and the like), and the like, as well as various combinations thereof.

At step 310, the selected subset of advertising content is presented. In one embodiment, the selected subset of advertising content may be presented in combination with other content (e.g., presented within a web page, as advertising within a television program, and the like). In one embodiment, the selected subset of advertising content may be presented independent of other content. In one embodiment, the selected subset of advertising content may be presented independent of any session between the wireless user terminal and a network system or component, or at least independent of the session by which the advertising content was received at the wireless user terminal.

For example, advertising content originally included within a web page and extracted from the web page for storage at the wireless user terminal may be presented at the wireless user terminal at a later time, e.g., after the Internet session has been terminated. For example, advertising content originally included within a television programming stream and extracted from the television programming stream for storage at the wireless user terminal may be presented at the wireless user terminal at a later time, e.g., after the television programming session has terminated.

The selected subset of advertising content is presented using one or more presentation interfaces of the wireless user device (e.g., one or more display screens, speakers, and the like). For example, for a mobile phone having two display screens (e.g., an inner screen and an outer screen), advertising content may be presented on one or both of the screens. In one embodiment, one or more advertising content presentation streams may be generated for presenting the advertising content.

Figure 4:
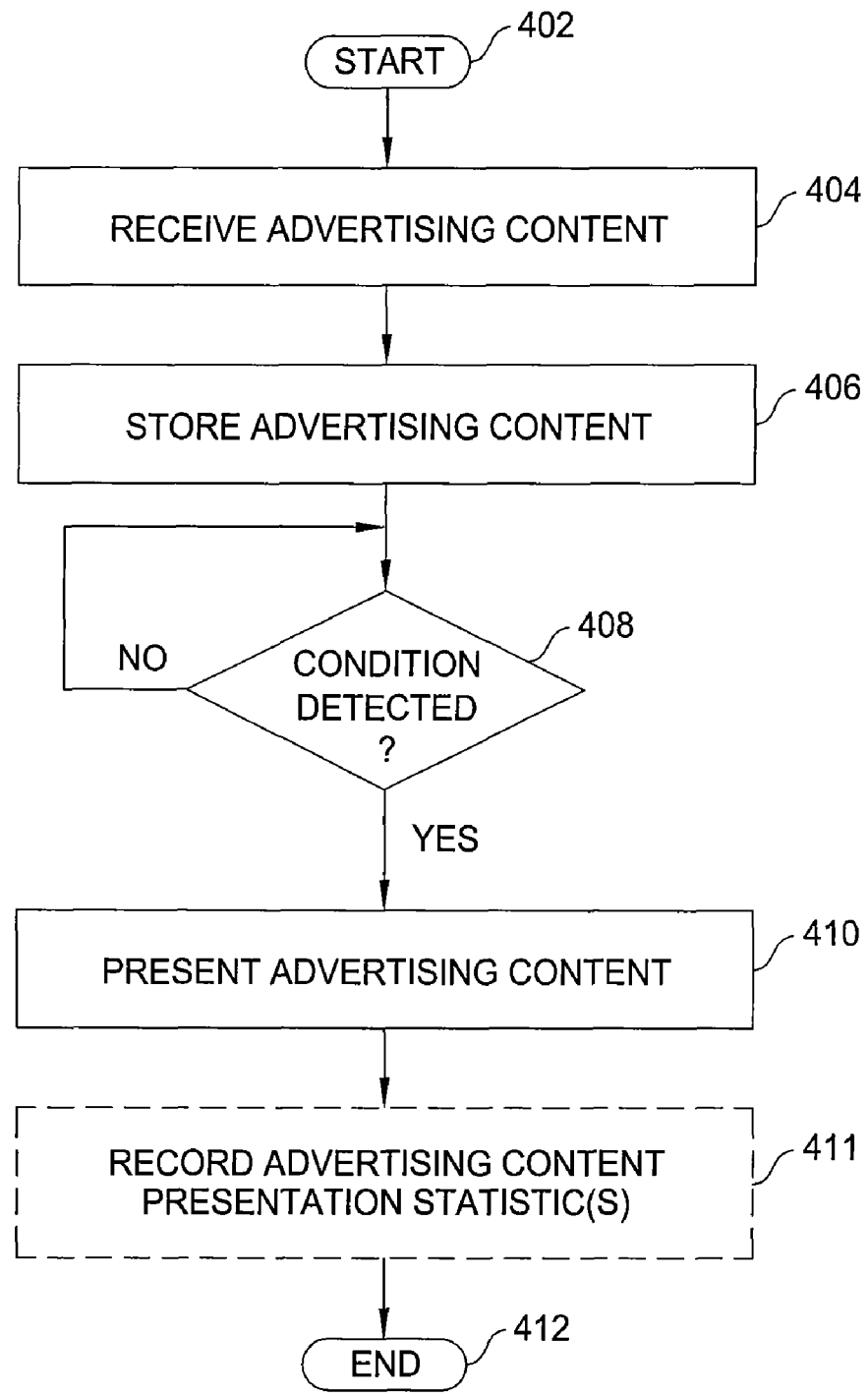
FIG. 4 depicts a method according to one embodiment of the present invention.

In one embodiment, selection of the subset of stored advertising content and subsequent presentation of the selected subset of advertising content may be performed in conjunction with the advertising content display mechanism depicted and described with respect to FIG. 4. In one embodiment, depicted as optional step 311, advertising content presentation statistics may be recorded. In one such embodiment, advertising content presentation statistics may be recorded in accordance with the advertising content presentation statistics collection mechanism depicted and described with respect to FIG. 5. At step 312, method 300 ends.

FIG. 4 depicts a method according to one embodiment of the present invention. Specifically, method 400 of FIG. 4 includes a method for presenting advertising content using one or more presentation interfaces. Although depicted and described as being performed serially, at least a portion of the steps of method 400 of FIG. 4 may be performed contemporaneously, or in a different order than depicted and described with respect to FIG. 4. The method 400 begins at step 402 and proceeds to step 404.

At step 404, advertising content is received. The advertising content is received at a wireless user terminal. The advertising content may be received over one or more of a unicast wireless channel(s), a multicast wireless channel(s), and a broadcast wireless channel(s). The advertising content may be received in combination with other content and/or separately from other content. The advertising content may include any content format, such as text-based advertisements, audio advertisements, image-based advertisements, video advertisements, multimedia advertisements, and the like, as well as various combinations thereof. At step 406, the received advertising content is stored at the wireless terminal.

At step 408, a determination is made as to whether a condition is detected (or exists). If a condition is not detected, method 400 remains within step 408 until a condition is detected. If a condition is detected, method 400 proceeds to step 410. At step 410, advertising content is presented in response to detection and/or existence of the condition at the wireless user terminal. The advertising content is presented independent of any session between the wireless user terminal and a network system or component. The advertising content is presented using one or more presentation interfaces of a wireless user device (e.g., display screen(s), speaker(s), and the like). In one embodiment, one or more presentation streams may be generated for presenting the advertising content.

The advertising content may be presented in any manner, depending on various factors, such as type and format of advertising content, capabilities of the wireless user terminal, and the like, as well as various combinations thereof. For example, advertising content may be presented using display screens, speakers, and like presentation interfaces. The advertising content may be displayed using the entire area of the display screen, a portion of the area of the display screen (e.g., using picture-in-picture, split screen, scrolling display such as a scrolling streamer of advertising content, and the like), and the like, as well as various combinations thereof. In one embodiment, for a mobile phone having two display screens (e.g., an inner screen and an outer screen), advertising content may be presented on one or both of the screens.

The condition is a condition detected or existing at the wireless user terminal which causes presentation of advertising content at the wireless user terminal. The condition causing presentation of advertising content may be: (1) detection of a condition, in which advertising content is presented in response to detection of the condition at the wireless user terminal; and/or (2) existence of a condition, in which advertising content is presented while the condition exists (or does not exist, depending on the type of condition) at the wireless user terminal. The advertising content may be presented based on various different conditions.

In one embodiment, advertising content is presented in response to the wireless user terminal being powered on. In one embodiment, advertising content is presented while the wireless user terminal is searching for a signal. In one embodiment, advertising content is presented in response to termination of a connection associated with the user terminal (e.g., when a user hangs up from a voice call, when a user terminates a web browsing session or Instant Messaging session, and the like). In one embodiment, advertising content is presented while the wireless user terminal is idle. The advertising content may be presented in response to combinations of such conditions, as well as in response to various other conditions associated with wireless user terminals (e.g., trigger conditions, wireless user terminal states, and the like, as well as various combinations thereof).

In such embodiments, in response to the condition(s) or during the existence of the condition(s), one or more advertisements may be retrieved from memory and presented using one or more presentation interfaces of the wireless user terminal. The advertisements may be presented aperiodically, periodically, and/or continuously, as well as various combinations thereof. The advertisements may be presented a predetermined number of times, for a predetermined length of time, as long as the condition exists, and the like, as well as various combinations thereof. The advertisements may be presented with any frequency and for any length of time (e.g., for a predetermined length of time after a condition is terminated, for the entire time a condition exists, and the like).

For example, the one or more advertisements may be presented during initial start-up of the wireless user terminal after the wireless user terminal is powered on, and may continue to be presented (after the initial start-up of the wireless user terminal (e.g., if the wireless user terminal is searching for a signal after being powered on, if the wireless user terminal is in an idle state after the signal is located, or in response to any other trigger condition or existing condition during which advertising content is to be presented, as described herein).

For example, the one or more advertisements may continue to be presented while the wireless user terminal is searching for a signal (possibly until a signal is found), and the one or more advertisements may continue to be presented even after a signal is found (e.g., if the wireless user terminal is in an idle state after the signal is found, or in response to any other trigger condition or existing condition during which advertising content is to be presented, as described herein).

For example, the one or more advertisements may be presented in response to termination of a connection, e.g., when a user hangs up from a voice call, when a user terminates a web browsing session or Instant Messaging session, and the like. The one or more advertisements may continue to be presented (e.g., if the wireless user terminal remains in an idle state after the connection is terminated, or in response to any other trigger condition or existing condition during which advertising content is to be presented, as described herein). In such embodiments, presentation of advertising content may depend on the type of wireless user terminal being used, the manner in which the user terminates the session, and like factors, as well as various combinations thereof.

For example, consider a mobile phone having two display screens (e.g., an inner screen and an outer screen typical in flip-type cell phones). In this example, if the user presses a key on the keypad to terminate the session, the advertisement(s) may be presented on the inner screen (e.g., until the user closes the flip phone, at which time the advertisement(s) is switched to being presented on the outer screen. Similarly, in this example, if the user closes the flip phone to terminate the session, the advertisement(s) may be presented on the outer screen (e.g., until the user opens the flip phone, at which time the advertisement(s) may be switched to being presented on the inner screen).

In one embodiment, one or more display screens of the wireless user terminal may alternate between presenting standard display information (e.g., date, time, background, and the like) and presenting advertising content. In one embodiment, multiple advertisements may be periodically presented using scrolling. For example, scrolling may include displaying scrolling text-based advertisements on one or more display screens, alternately presenting video advertisements on one or more display screens (e.g., in a round-robin manner which may or may not include breaks between the video advertisements), and the like, as well as various combinations thereof.

In one embodiment, presentation of advertising content on the wireless user terminal may depend on whether or not the wireless user terminal is connected to a power outlet. In one such embodiment, regardless of detection and/or existence of other conditions, advertising content may or may not be presented depending on whether or not the wireless user terminal is connected to a power outlet. For example, advertising content may only be presented in response to one of the other conditions while the wireless user terminal is connected to a power outlet.

In one embodiment, presentation of advertising content on the wireless user terminal may vary depending on whether or not the wireless user terminal is connected to a power outlet. (i.e., presentation of advertising content when the wireless user terminal is connected to a power outlet is different than presentation of advertising content when the wireless user terminal is not connected to a power outlet). For example, parameters such as frequency of presentation, quality of presentation, and the like may vary depending on whether or not the wireless user terminal is connected to a power outlet.

In one embodiment, while the user terminal is connected to a power outlet, advertising content may be presented with a higher frequency (e.g., one advertisement each minute rather than one advertisement every five minutes) than when the wireless user terminal is not connected to a power outlet, advertising content may be presented at a higher quality (e.g., presenting video clips rather than image-based content, presenting image-based content rather than text-based content, presenting a high quality version of a video clip, and the like) than when the wireless user terminal is not connected to a power outlet, and the like, as well as various combinations thereof.

In one embodiment, while the user terminal is not connected to a power outlet, advertising content may be presented with a lower frequency (e.g., one advertisement every five minutes rather than one advertisement each minute) than when the wireless user terminal is connected to a power outlet, advertising content may be presented at a lower quality (e.g., presenting text-based content rather than image-based content, presenting image-based content rather than video clips, presenting a lower quality version of a video clip rather than a higher quality version of the video clip, and the like) than when the wireless user terminal is connected to a power outlet, and the like, as well as various combinations thereof.

In such embodiments, when a wireless user terminal detects that the wireless user terminal has been connected to a power outlet, the wireless terminal may automatically modify one or more such parameters according to which advertising content is being presented on the wireless user terminal (e.g., increasing frequency, increasing quality, and the like). Similarly, in such embodiments, when a wireless user terminal detects that the wireless user terminal has been disconnected from a power outlet, the wireless terminal may automatically modify one or more such parameters (e.g., decreasing frequency, decreasing quality, and the like) according to which advertising content is being presented on the wireless user terminal.

Thus, advertising content may be presented: (1) in response to one or more conditions (e.g., in response to the wireless user terminal being powered on, in response to termination of a connection, and the like, as well as various combinations thereof) and/or (2) during the existence of one or more conditions (e.g., the wireless user terminal being in a particular state such as an idle state, a searching-for-signal state, and the like, the wireless user terminal being connected to or disconnected from a power outlet, and the like, as well as various combinations thereof). Furthermore, although primarily depicted and described herein with respect to conditions associated with starting, continuing, and modifying presentation of advertising content, presentation of advertising content may be terminated in response to one or more trigger conditions or during the existence of one or more conditions.

In one embodiment, in which advertisements are presented in response to different conditions, different advertisements or different sets of advertisements may be presented. The different advertisement or different sets of advertisements may be presented in response to the different trigger conditions or existing conditions. The different advertisements or sets of advertisements may be group based on one or more factors, such as the format of advertising content, the type of advertising content, and like factors, as well as various combinations thereof.

For example, one advertisement may be presented in response to a wireless user terminal being powered on, while one or more other advertisements may be presented thereafter (e.g., while the wireless user terminal is searching for a signal, while the wireless user terminal is idle, and the like, as well as various combinations thereof). For example, one set of advertisements may be presented while the wireless user terminal is searching for a signal and a different set of advertisements may be presented while the wireless user terminal is idle. For example, text-based advertisements may be presented as a wireless user terminal is searching for a signal while video advertisements may be presented while the wireless user terminal is idle and plugged into a power outlet.

In one embodiment, a subset of the stored advertising content may be selected for presentation. In one such embodiment, the subset of stored advertising content selected for presentation may be selected using the advertising content selection mechanism depicted and described with respect to FIG. 3. In one embodiment, depicted as optional step 411, advertising content presentation statistics may be recorded. In one such embodiment, advertising content presentation statistics may be recorded in accordance with the advertising content presentation statistics collection mechanism depicted and described with respect to FIG. 5. At step 412, method 400 ends.

This advertising content presentation mechanism is advantageous because it decouples the presentation of advertisements from specific applications. For example, advertising content is not only presented during a web browsing session or during a video clip play-out time; rather, advertising content may be presented on the wireless user terminal at any time. Furthermore, using different embodiments described herein, presentation of advertising content can be targeted to occur during times at which users are more likely to be paying attention to the wireless user device (e.g., when the wireless user terminal is powered on, while the user is waiting for the wireless user terminal to locate a wireless signal, when the user terminates a session, and the like).

Although primarily depicted and described herein with respect to embodiments in which the advertising content presentation mechanism is controlled on the wireless user terminal, in one embodiment, the advertising content presentation mechanism may be controlled by one or more network components. In one embodiment, a network component may detect different conditions associated with the wireless user terminal and, in response to detecting one or more conditions, may initiate signaling to the wireless user terminal that is adapted to instruct the wireless user terminal to present advertising content. In one embodiment, such signaling from the network component may specify details about presentation of the advertising content, e.g., as format, type (including identifying specific advertisements), periodicity, and like factors, as well as various combinations thereof, as described herein.

Figure 5:
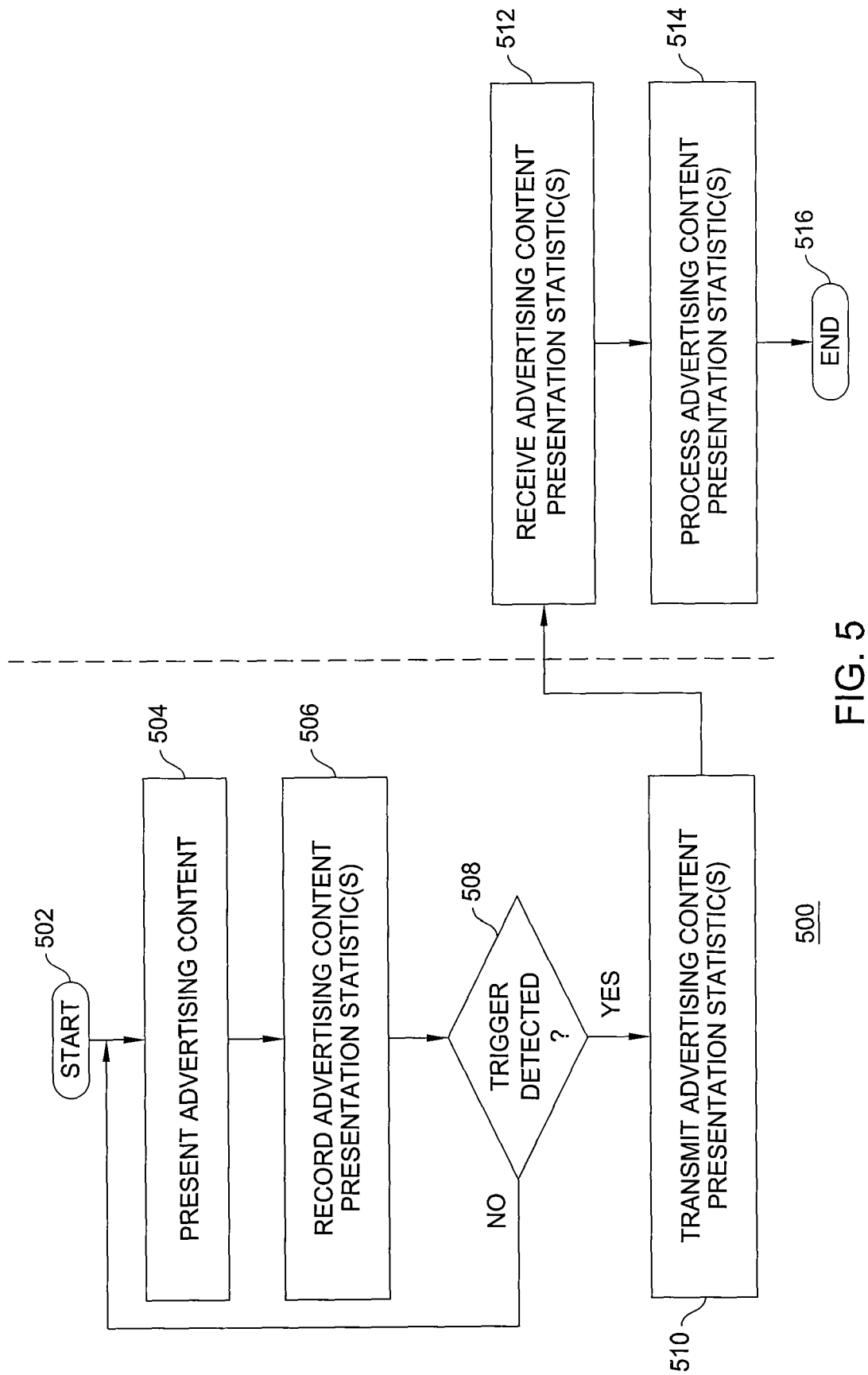
FIG. 5 depicts a method according to one embodiment of the present invention.

FIG. 5 depicts a method according to one embodiment of the present invention. Specifically, method 500 of FIG. 5 includes a method for collecting advertising content presentation statistics at a wireless user terminal and providing collected advertising content presentation statistics to one or more network systems. Although depicted and described as being performed serially, at least a portion of the steps of method 500 of FIG. 5 may be performed contemporaneously, or in a different order than depicted and described with respect to FIG. 5. The method 500 begins at step 502 and proceeds to step 504.

At step 504, advertising content is presented at a wireless user terminal. The advertising content may include any format and type of advertising content. The advertising content may be presented using one or more presentation interfaces. In one embodiment, advertising content may be presented using one or both of the advertising content selection mechanism of method 300 depicted and described herein with respect to FIG. 3 and the advertising content presentation mechanism of method 400 depicted and described herein with respect to FIG. 4. The advertising content may be presented using various other content presentation schemes.

At step 506, one or more advertising content presentation statistics is recorded at the wireless user terminal in response to the advertising content being presented. The advertising content presentation statistics may record the amount of advertising content presented at the wireless user terminal, which may be measured using one or more of the length of time during which advertising content was presented (e.g., in second, minutes, and the like), the number of times advertising content was presented, and like measures, as well as various combinations thereof. In some embodiments, advertising content presentation statistics may record an indication as to whether a particular advertisement was presented at the wireless user terminal, the number of times specific advertisements were presented at the wireless user terminal, and the like, as well as various combinations thereof.

The advertising content presentation statistics may include any other information about advertising content presented on the wireless user terminal. In some embodiment, many different types of such statistics may be recorded. Furthermore, in some embodiments, such statistics may be further subclassified to record the statistics according to categories such as formats of advertising content presented (e.g., amount of text-based advertising content, amount of video advertisements, and the like), types of advertising content (e.g., amount of advertising content related to sports, amount of advertising content related to television programming, and the like), and the like, as well as various combinations thereof. The present invention is not limited by these examples of advertising content presentation statistics.

At step 508, a determination is made as to whether a trigger is detected (i.e., triggering transmission of advertising content presentation statistics upstream to one or more network systems). If a trigger is not detected, method 500 returns to step 504 such that advertising content may continue to be presented, and associated advertising content presentation statistics continue to be collected, until a trigger is detected. In other words, although depicted and described as a serial process, since a trigger may be detected at any time, advertising content presentation statistics may be transmitted upstream by the wireless user terminal at any time. If a trigger is detected, method 500 proceeds to step 510.

In one embodiment, the trigger condition may be completion of the presentation of the advertising content at the wireless user device (e.g., after an advertisement is finished being presented at the wireless user terminal, the wireless user terminal generates and transmits one or more associated statistics). In one embodiment, the trigger condition may be a periodic trigger condition such that advertising content presentation statistics are transmitted upstream by the wireless user terminal periodically (e.g., once per day, once per week, and the like). The advertising content presentation statistics may be transmitted by the wireless user terminal in response to various combinations of aperiodic and periodic triggers.

At step 510, one or more advertising content presentation statistics (depending on types of statistics collected, implementation of the trigger, and like factors) is transmitted by the wireless user terminals. The advertising content presentation statistics are transmitted using a unicast channel of the wireless user terminal. The advertising content presentation statistics may be transmitted to one or more network systems. At step 512, the one or more advertising content presentation statistics are received at the one or more network systems. The network systems may include any system or systems which may utilize advertising content presentation statistics, such as media servers, trend processing systems, user account management systems, billing management systems, and the like, as well as various combinations thereof.

At step 514, the one or more network systems process the received advertising content presentation statistics. In one embodiment, the advertising content presentation statistics may be combined with advertising content presentation statistics received from other wireless user terminals for various different purposes. In one embodiment, the advertising content presentation statistics may be stored in a manner for associating the advertising content presentation statistics with the user from which the advertising content presentation statistics are received (and/or the wireless user terminal associated with the wireless user terminal from which the statistics are received).

In one embodiment, in which advertising content presentation statistics of different wireless user terminals are combined, the combined advertising content presentation statistics may be processed for various purposes. In one embodiment, for example, the combined statistics may be processed for use in selecting advertising content to multicast and/or broadcast to users in the future. In another embodiment, for example, the combined statistics may be processed in order to generate advertising trend data. The advertising trend data may be used by content providers, advertisers, and the like, as well as various combinations thereof. For example, advertising trend data may be used by advertisers in order to assess levels of interest by consumers for various services and products.

In one embodiment, in which the advertising content presentation statistics are associated with the user from which the advertising content presentation statistics are received, the advertising content presentation statistics may be used for various purposes. In some such embodiments, the advertising content presentation statistics may be associated with one or more profiles and/or accounts of the user, e.g., for use in selecting advertising content delivered to the user in the future, for use in remunerating the user for reviewing the advertising content (e.g., for reviewing specific advertising content, for reviewing specific quantities of advertising content, and the like), and the like, as well as various combinations thereof.

In one embodiment, in which the advertising content presentation statistics are used to remunerate the associated user for reviewing advertising content (or at least for presentation of advertising content at the wireless user terminal of the user, where or not the user is actually reviewing the presented advertising content), various different remuneration schemes may be used. In one embodiment, the user may be provided x remunerations for y advertising content presented at the wireless user terminal. The x remunerations provided to the user may include various different types and quantities of remunerations. The y advertising content upon which the user remunerations are based may be measured in various different ways.

The determination of remunerations x may depend on various factors, such as the type of remuneration offered, the type of content reviewed, and the like, as well as various combinations thereof. For example, the user may be rewarded with a credit to their bill. For example, the user may be rewarded with x free minutes of connection time, x amount of free bandwidth, x number of free text messages, and the like, as well as various combinations thereof. For example, the user may be rewarded with x free coupons (or x free dollars worth of coupons) for various services, products, and the like (e.g., coupons to their favorite restaurants, generic gift certificates good at various locations, and the like), and the like, as well as various combinations thereof.

The advertising content y may be measured based on various factors, such as the number of advertisements presented, length of time of presentation of advertisements, the formats and/or types of advertisements presented, weights given to specific advertisements, and like, factors, as well as various combinations thereof. For example, remuneration provided to users for reviewing image-based advertisements and reviewing video-based advertisements may be different (e.g., remuneration x for reviewing y number of advertisements). For example, advertisers may have an option to pay more to have their advertisements weighted higher so that, in turn, users are more likely to review those advertisements to receive the higher level of remuneration.

Figure 6:
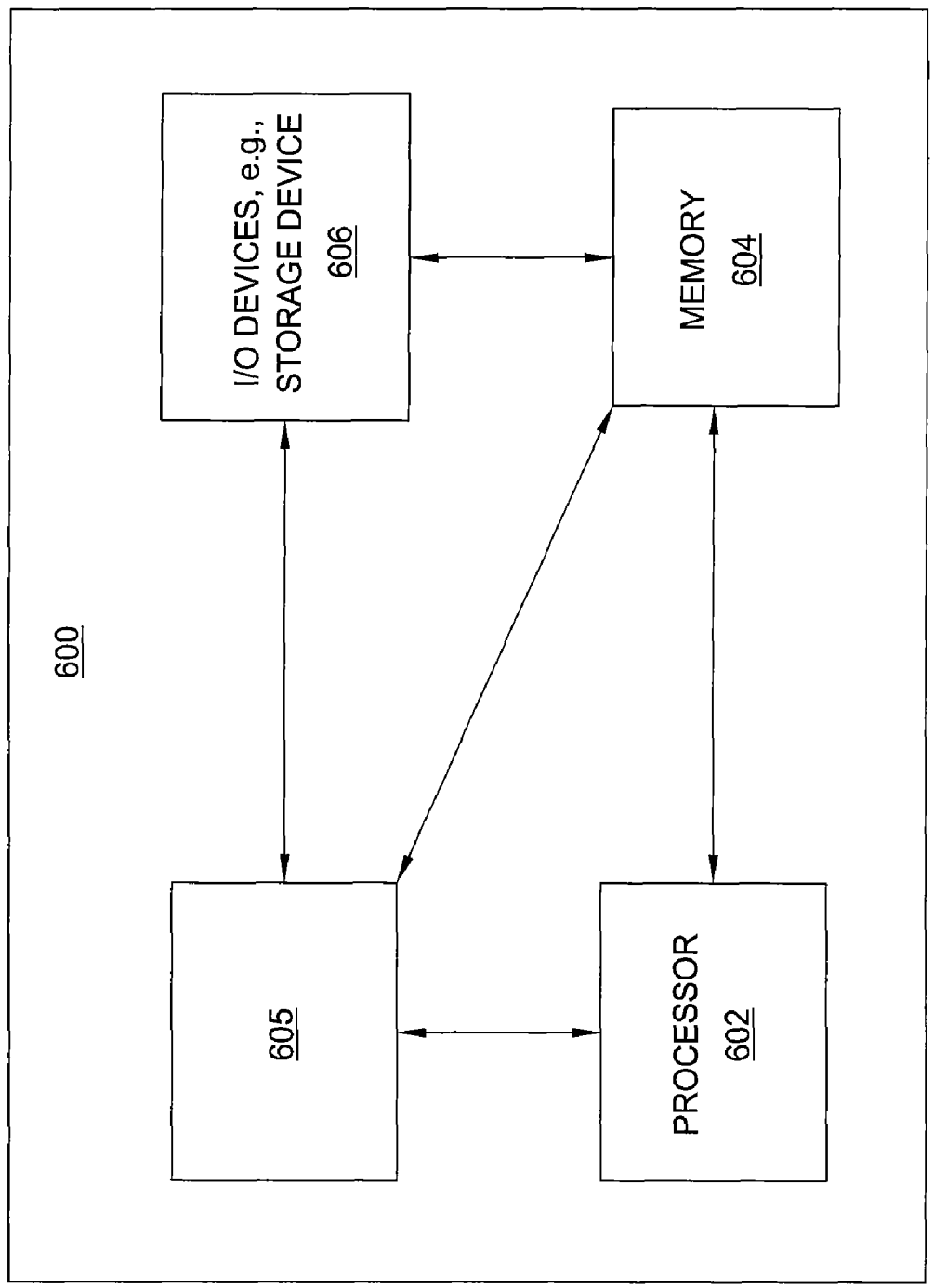
FIG. 6 depicts a high-level block diagram of a general-purpose computer suitable for use in performing the functions described herein.

FIG. 6 depicts a high-level block diagram of a general-purpose computer suitable for use in performing the functions described herein. As depicted in FIG. 6, system 600 comprises a processor element 602 (e.g., a CPU), a memory 604, e.g., random access memory (RAM) and/or read only memory (ROM), an advertising content control module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present advertising content control process 605 can be loaded into memory 604 and executed by processor 602 to implement the functions as discussed above. As such, advertising content control process 605 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although primarily depicted and described herein with respect to user profiles being stored on the wireless user terminals, in one embodiment the user profiles (or at least some portion of the user profile information) may be stored in the network (e.g., on one or more network devices) rather than the wireless user terminals (or at least some user profile information is stored in the network in addition to user profile information stored at the wireless user terminals). In one such embodiment, for example, the user profiles may be provided to the wireless user terminals such that a wireless user terminal, upon receiving advertising content and its associated user profile (or user profile information), can perform the advertising content selection functions of the present invention.

For example, in one embodiment, advertising content may be provided to user terminals using multicast and/or broadcast wireless channels, and the user profiles (or at least some user profile information) may be provided to the user terminals using respective unicast wireless channels, such that the wireless user terminals may use network-stored user profiles to perform local selection of a subset of the received advertising content. In one embodiment, for example, in which user profile information is stored in the network and provided to the user terminals, transmission of the user profile information to the wireless user devices may be initiated by the network or, alternatively, may be requested by the wireless user terminals (e.g., a user profile stored on a wireless user terminals may store a URL to a network site from which the wireless user device can retrieve additional user profile information for use in performing advertising content selection functions).

Furthermore, various other functions of the present invention may be supported using user profiles stored on the network rather than the wireless user terminals (or at least using some user profile information that is stored on the network in addition to user profile information stored at the wireless user terminals).

Although various embodiments which incorporate the teachings of the present invention have been shown and described in detail herein, those skilled in the art can readily devise many other varied embodiments that still incorporate these teachings.

What is claimed is:

1. A method for presenting advertising content at a wireless user terminal, comprising:
   receiving advertising content at the wireless user terminal, wherein the advertising content is received over at least one of a unicast wireless channel, a multicast wireless channel and a broadcast wireless channel;
   selecting a subset of the received advertising content using user profile information stored at the wireless user terminal; and
   presenting the selected subset of advertising content using at least one presentation interface of the wireless user terminal.

2. The method of claim 1, wherein selecting the subset of received advertising content comprises:
   comparing at least one keyword associated with the received advertising content to at least one keyword of the user profile information.

3. The method of claim 1, wherein selecting the subset of received advertising content comprises:
   parsing the received advertising content to assign at least one keyword to the advertising content; and
   comparing the at least one keyword assigned to the parsed advertising content to at least one keyword of the user profile information.

4. The method of claim 1, wherein storing the advertising content comprises:
   extracting the received advertising content from a combination of the received advertising content and other received content; and
   storing the extracted advertising content.

5. The method of claim 1, wherein the selected subset of advertising content is presented in response to a condition.

6. The method of claim 1, wherein the condition comprises at least one of the wireless user terminal being powered on, the wireless user terminal searching for a signal, termination of a connection associated with the wireless user terminal, and the wireless user terminal being in an idle state.

7. The method of claim 1, further comprising:
   recording an indication of the presentation of the advertising content at the wireless user terminal; and
   propagating the indication of the presentation of the advertising content toward a server using the unicast wireless channel.

8. A method for presenting advertising content on a wireless user terminal, comprising:
   receiving advertising content at the wireless user terminal;
   storing the received advertising content; and
   in response to a condition at the wireless user terminal, presenting the advertising content using at least one presentation interface of the wireless user terminal, wherein the advertising content is presented independent of a session between the wireless user terminal and a network component.

9. The method of claim 8, wherein the condition comprises at least one of the wireless user terminal being powered on, the wireless user terminal searching for a signal, termination of a connection associated with the wireless user terminal, the wireless user terminal being in an idle state, the wireless user terminal being connected to a power outlet, and the wireless user terminal being disconnected from a power outlet.

10. The method of claim 8, wherein presenting the content comprises:
    periodically presenting the advertising content on the at least one presentation interface of the wireless user terminal.

11. The method of claim 10, wherein the advertising content is periodically presented as long as the condition exists on the wireless user terminal.

12. The method of claim 8, wherein periodically presenting the advertising content comprises at least one of:
    periodically alternating between standard display information and the advertising content; and
    displaying the advertising content using a scroll bar.

13. The method of claim 8, further comprising:

in response to the wireless user terminal being connected to a power outlet, increasing at least one of a frequency with which the advertising content is presented and a quality with which the advertising content is presented.

14. The method of claim 8, further comprising:

in response to the wireless user terminal being disconnected from a power outlet, decreasing at least one of a frequency with which the advertising content is presented and a quality with which the advertising content is presented.

15. The method of claim 8, wherein presenting the advertising content comprises:

selecting a subset of the advertising content using user profile information stored on the wireless user terminal; and in response to the condition at the wireless user terminal, presenting the selected subset of advertising content using the at least one presentation interface of the wireless user terminal.

16. The method of claim 8, further comprising:

generating at least one statistic associated with presentation of the advertising content at the wireless user terminal; and propagating the at least one statistic toward a network system using a unicast wireless channel.

* * * * *